United States Patent
Anderson et al.

(10) Patent No.: US 6,296,480 B1
(45) Date of Patent: Oct. 2, 2001

(54) CIRCULATING OIL HEATER

(75) Inventors: Kent L. Anderson; Jeffrey D. Ensminger, both of Vernal, UT (US)

(73) Assignee: Advanced Fabrication Technology, LLC., Vernal, UT (US)

( * ) Notice: Subject to any disclaimer, the term of this patent is extended or adjusted under 35 U.S.C. 154(b) by 0 days.

(21) Appl. No.: 09/514,732

(22) Filed: Feb. 28, 2000

(51) Int. Cl.$^7$ ........................................ F24H 4/02
(52) U.S. Cl. .................... 432/219; 432/223; 126/99 C
(58) Field of Search .................... 432/219, 220, 432/221, 222, 223; 165/143, 144, 145, 163; 126/99 C, 99 D; 34/72, 75; 122/356

(56) References Cited

U.S. PATENT DOCUMENTS

| | | | |
|---|---|---|---|
| Re. 25,006 | 7/1961 | Throckmorton et al. | 122/356 |
| 1,570,674 | * 1/1926 | Johnson | 432/219 |
| 2,856,903 | 10/1958 | Leech et al. | 122/356 |
| 3,447,602 | * 6/1969 | Dalin | 432/219 |
| 4,067,314 | * 1/1978 | Bollefer | 126/270 |
| 4,387,766 | * 6/1983 | Miller | 165/172 |
| 5,038,750 | 8/1991 | Pipka et al. | 126/99 |
| 5,224,542 | 7/1993 | Hemsath | 166/272 |
| 5,492,168 | 2/1996 | Hemsath | 165/47 |
| 5,524,606 | 6/1996 | Strat | 126/99 |

* cited by examiner

Primary Examiner—Jiping Lu
(74) Attorney, Agent, or Firm—Jenkens & Gilchrist, P.C.

(57) ABSTRACT

A fluid heater has concentrically disposed radiantly heated and convectionally heated sections. The radiantly heated section includes a helically coiled tube defining a cylindrical chamber in which a flame produced by a burner primarily radiantly heats the coiled tube. The helically coiled tube has an outer perimeter about which a plurality of finned tubes are concentrically disposed and are heated by convection transfer of thermal energy. The oil heater embodying the present invention provides a compact oil heater that has greatly increased heating efficiency, reduced heat loss through the shell of the heater, and reduced internal stresses.

10 Claims, 5 Drawing Sheets

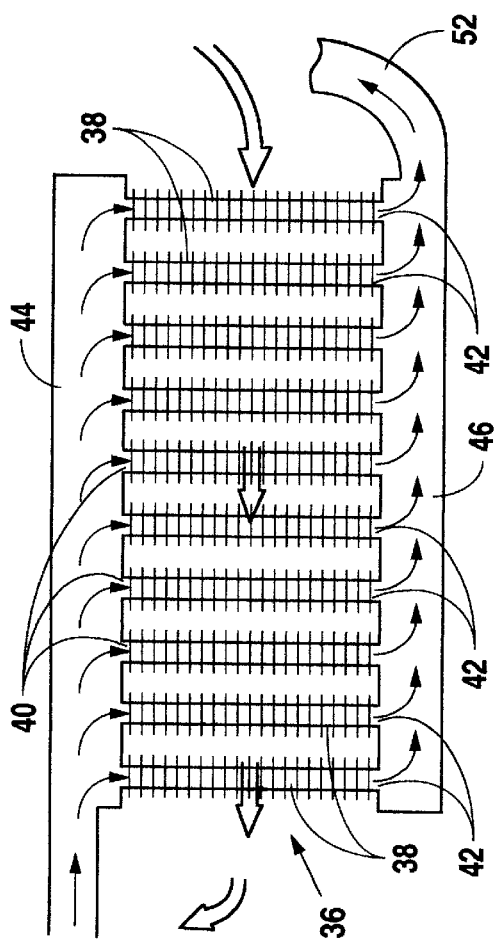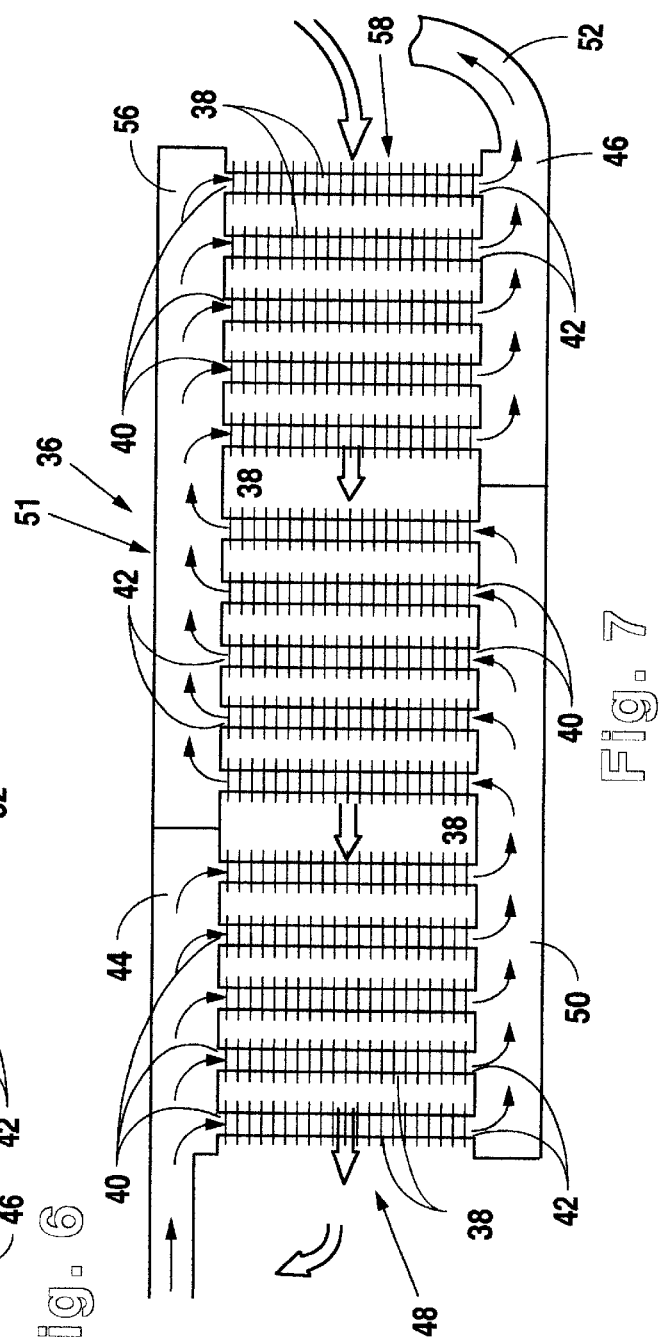

CIRCULATING OIL HEATER

BACKGROUND OF THE INVENTION

1. Technical Field

This invention relates generally to an oil heater and more particularly to an oil heater having both radiantly and convectionally heated sections.

2. History of Related Art

Oil heaters are commonly used for a variety of industrial and commercial applications, such as in chemical process heating, petroleum refining, asphalt heating, and lubrication oil and fuel oil heating. Oil heaters are also used to heat other fluids, such as fluids used in metal heat treating and quenching, space heating, food processing and similar applications.

Heretofore circulating oil heaters have been only partially efficient, frequently emitting exhaust gases having a temperature of 500° F. or above. Also, oil heaters having both radiantly and convectionally heated sections have generally been only limitedly efficient because the radiantly heated section and the convectionally heated section have generally been disposed in separate chambers, each having a shell through which heat can be transferred to the surrounding atmosphere and adding length to the heater package. As a result of the added heat loss, the heating efficiency of the oil heater is reduced.

Other oil heater arrangements may provide limited convection heating as a result of positioning some of the flow conduits in the same chamber with a radiantly heated section. For example, U.S. Pat. No. 4,387,766 issued Jun. 14, 1983 to John H. Miller, and titled HOT OIL HEATER WITH HELICAL COIL AND BAFFLE discloses a single helical coil supported on longitudinally oriented tubes which act as skids to support the helical coil within the heater. Fluid flows through the skids, and arguably the skids could be considered as providing limited heat transfer to the incoming fluid as a result of convection heating. However, the convection heating of the incoming oil provided by the longitudinal tubes is quite limited as a result of the tubes having of a relatively short length and being disposed in a lower portion of the firebox, away from the hot gas stream as it flows toward an exhaust stack.

The present invention is directed to overcoming the problems set forth above. It is desirable to have an oil heater that is both space efficient and is efficient in transferring heat from a heat source to a fluid heated by the oil heater.

SUMMARY OF THE INVENTION

In accordance with one aspect of the present invention, an oil heater has a helically coiled tube coaxially disposed about a central axis, and a plurality of finned tubes concentrically disposed about the helically coiled tube. Each of the finned tubes has an inlet end and outlet end. The inlet end of at least one of the finned tubes is in fluid communication with a source fluid to be heated, and the outlet end of at least one of the finned tubes is in fluid communication with an inlet end of the helically coiled tube. The oil heater further includes a burner aligned with the central axis of the helically coiled tube.

In accordance with another aspect of the present invention, an oil heater includes an insulated firebox having a longitudinal axis, a burner disposed at one end of the firebox whereat the burner is positioned to direct a flame into the firebox in a direction coaxially aligned with the longitudinal axis of the firebox. The oil heater further includes a helically coiled tube primarily radiantly heated by the flame produced by the burner, and a plurality of finned tubes primarily heated by convection provided by hot gases produced by the flame. The finned tubes are concentrically disposed about the helically coiled tube, in axial alignment with the helically coiled tube.

BRIEF DESCRIPTION OF THE DRAWINGS

A more complete understanding of the structure and operation of the present invention may be had by reference to the following detailed description when taken in conjunction with the accompanying drawings, wherein:

FIG. 6 is a schematic diagram showing fluid and gas flow through the convectionally heated portion of the oil burner embodying the present invention, in which the convectionally heated portion comprises a single section of finned tubes arranged in parallel; and FIG. 7 is a schematic diagram showing fluid and gas flow through the convectionally heated portion of the oil burner embodying the present invention, in which the convectionally heated portion comprises three sections of parallel flow finned tubes arranged in parallel.

DETAILED DESCRIPTION OF A PRESENTLY PREFERRED EXEMPLARY EMBODIMENT

Figure 1:
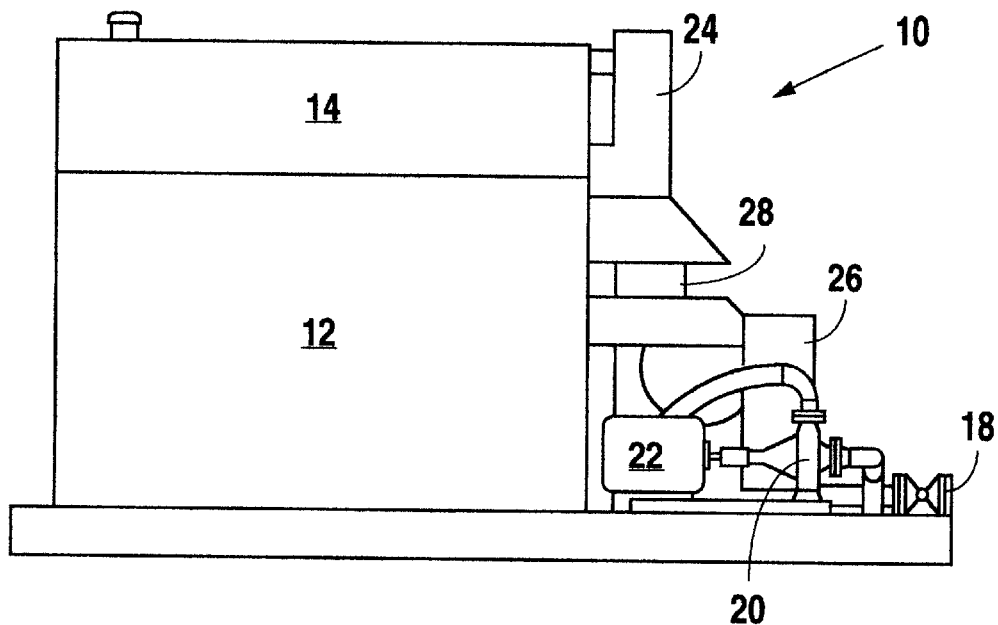
FIG. 1 is a side view of the oil heater embodying the present invention.
Figure 2:
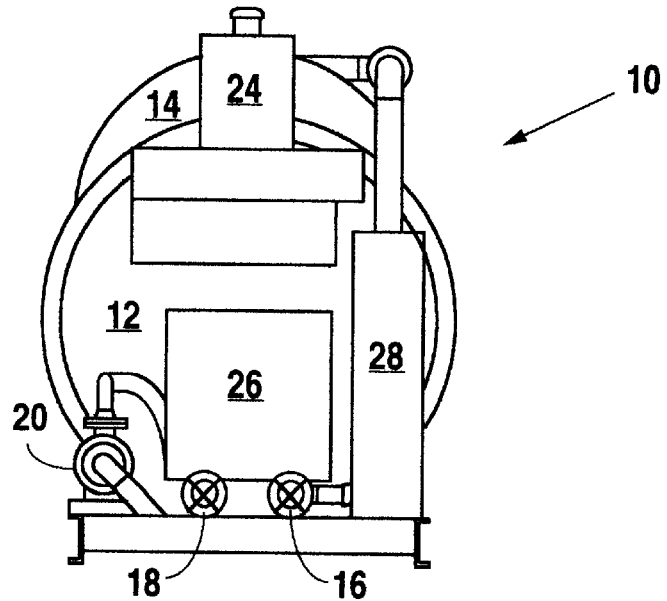
FIG. 2 is an end view of the oil heater embodying the present invention.
Figure 5:
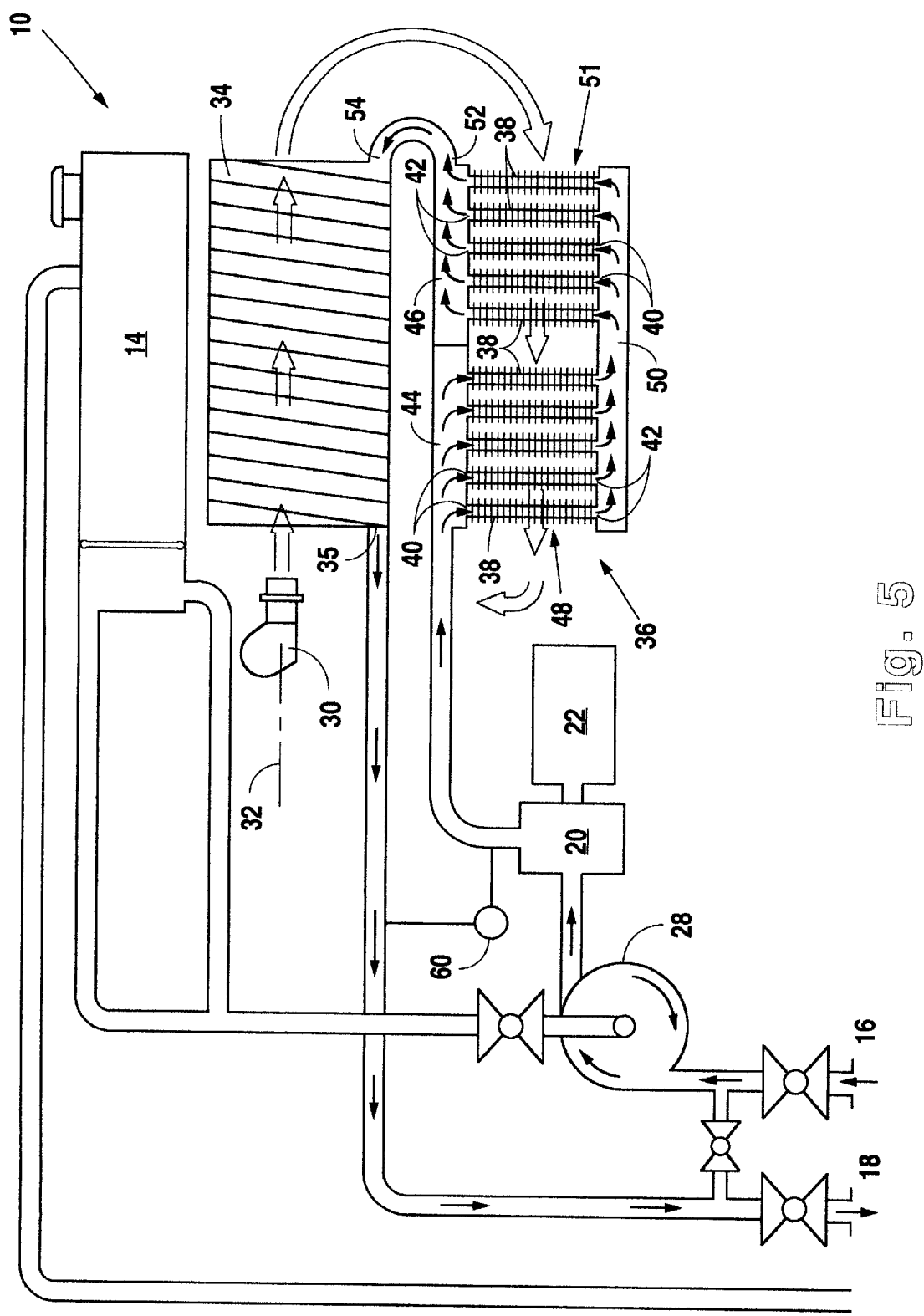
FIG. 5 is a schematic diagram showing the route of fluid flow and heated gas flow through the radiantly heated and convectionally heated sections of the oil burner embodying the present invention, with the concentrically disposed radiantly heated and convectionally heated sections displaced in side by side relationship for purposes of illustration.

An oil heater illustrating a preferred embodiment of the present invention is generally indicated by the reference numeral 10 in FIGS. 1, 2 and 5. The oil heater 10 has a generally circular insulated firebox 12 with a fluid expansion tank 14 mounted vertically above, and contiguous with, the firebox 12. The expansion tank 12 is generally crescent-shaped, with the bottom of the expansion tank 14 curved to mate with the outside curvature of the firebox 12. This feature reduces the overall height of the unit and thereby increases portability without disassembly. Highway shipment of oil heaters is subject to height restrictions, which are more easily met by the compact design of the oil heater 10 embodying the present invention.

The oil heater 10 also has an inlet port 16 at which fluid to be heated is introduced, and an outlet port 18 from which heated fluid is discharged. Fluid flow through the oil heater 10 is aided by a circulation pump 20 driven by a motor 22. In an illustrative embodiment, the circulating pump 20 is a 15 hp horizontal centrifugal pump specifically designed for high temperature applications, and provides an output of about 250 gpm at 60 psi.

Figure 3:
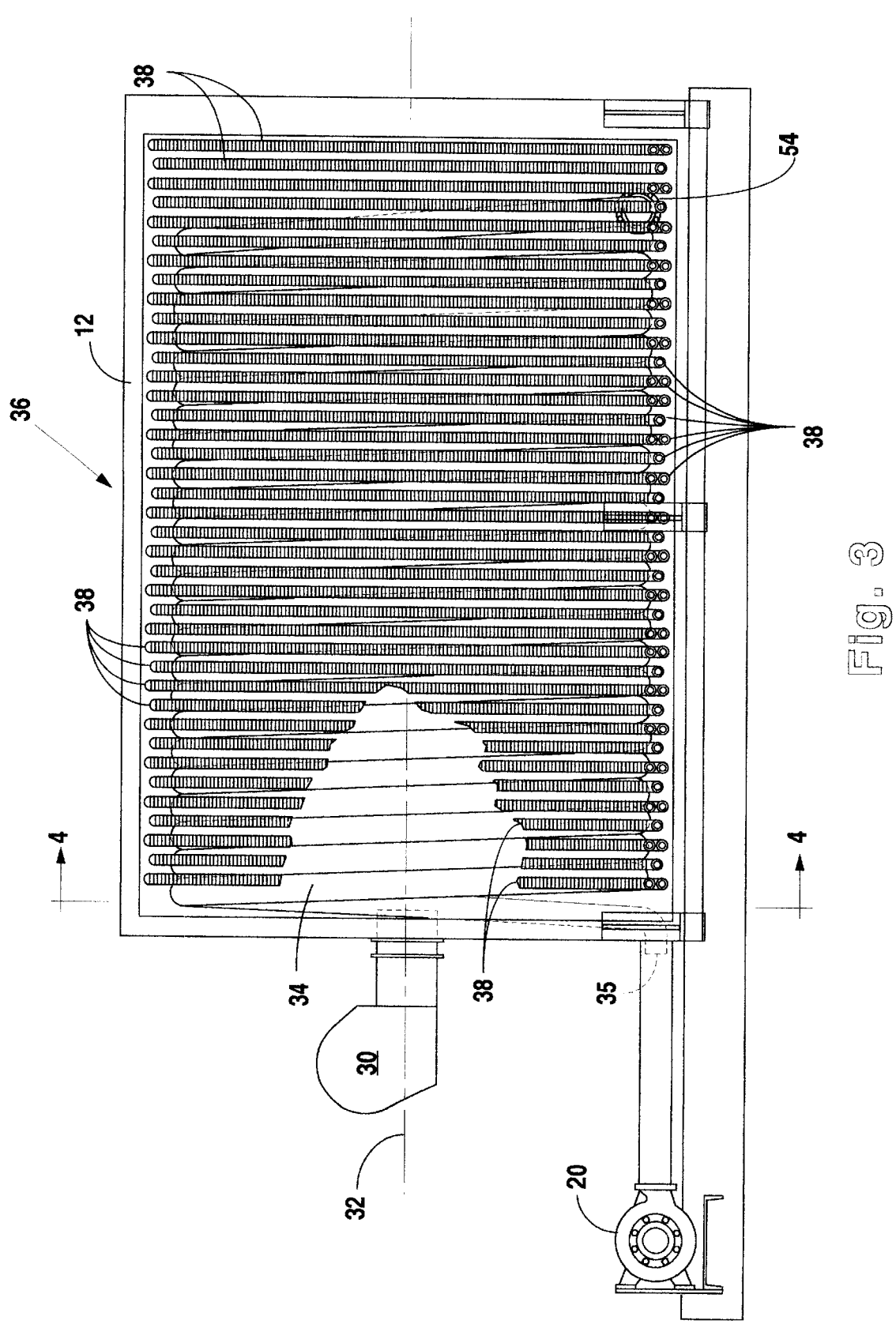
FIG. 3 is a side view of the fluid heating sections of the oil heater embodying the present invention, with a portion of the convection heating section broken away to show a portion of the radial heating section.

A burner 30, as represented schematically in FIG. 5, is mounted on the end wall of the firebox 12, and directs a flame along a centrally disposed longitudinal axis 32 extending through the firebox 12, as illustrated in FIGS. 3 and 5. An exhaust stack 24 provides for discharge of exhaust gases from the firebox 12 to the surrounding environment. An electrical control panel 26 is disposed externally of the firebox 12, and a vapor removal chamber, for example a cyclonic gas separator, 28 removes air and other gases from the incoming fluid to be heated. The vapor removal chamber 28 eliminates entrained vapors trapped in the circulation system, and serves as a relaxation chamber allowing any vapor entrained in the fluid to separate and flow upward into the top of the fluid expansion tank 14, which is vented to atmosphere.

The expansion tank 14 provides a reservoir of cooler fluid which is not directly circulated through the radiantly and convectionally heated sections of the oil heater 10. Suction to the circulating pump 20 is drawn from the bottom of the vapor removal chamber 28. By keeping the non-circulating fluid's surface temperature at a minimum, the life of the heat transfer fluid is extended. The expansion tank 14 is equipped with a float switch which is interlocked to shut down the system if the level of heat transfer fluid drops below preset limits.

Figure 4:
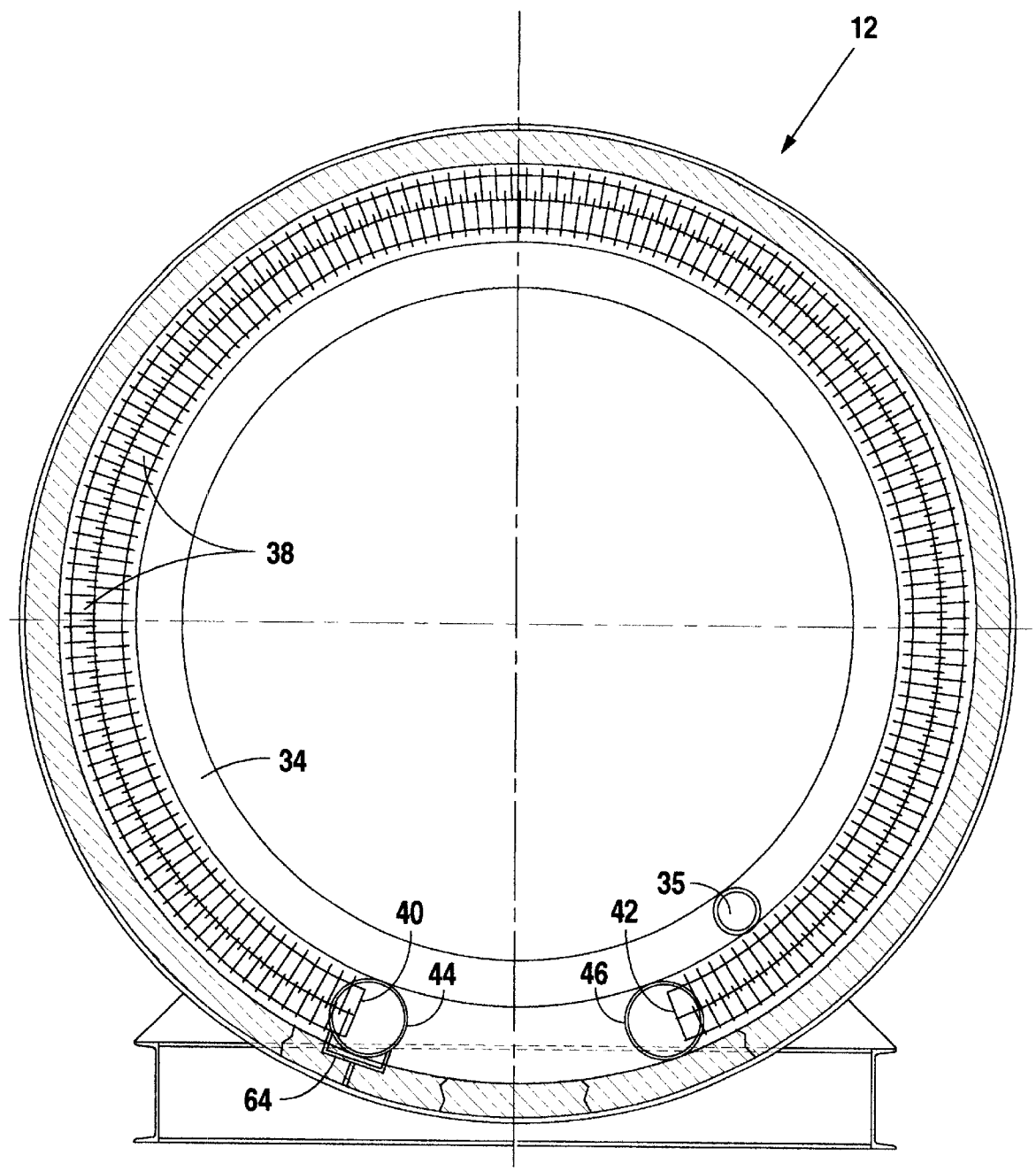
FIG. 4 is a cross-sectional view of the firebox of the oil heater embodying the present invention, taken along the line 4—4 of FIG. 3.

Importantly, the oil heater 10 embodying the present invention has concentrically disposed radiantly heated and convectionally heated heat transfer sections 34, 36. In FIGS. 5–7, gas flow through the oil heater 10 is represented by open arrows, and fluid flow by solid arrows. Fluid to be heated first passes through the convectionally heated section 36 and then through the radiantly heated section 34 and exits an outlet end 35, prior to discharge from the oil heater 10. As illustrated in FIGS. 3–5, the radiantly heated section 34 is formed of a helically coiled tube that forms an inner cylindrical chamber through which the flame is directed. The helically coiled tube 34 is concentrically disposed about the longitudinal axis 32.

The pitch of adjacent coils in the radiantly heated helical coil section is essentially the same as the outside diameter of the tube 34. Therefore, there is no clearance and, consequently, no substantial gas flow between adjacently disposed coils of the tube 34 except for one or two, or other predetermined small number, of coils disposed at the end of the firebox 12 spaced from the burner 30. Thus, a flame produced by the burner 30 directly heats the helically coiled tube 34 by radiation, as well as by convection through the hot gases heated by the flame produced by the burner 30. However, in the helically coiled tube section 34, the primary heating mechanism is by the transfer of radiant heat energy. The spaced-apart coils at the end of the helically coiled tube 34 spaced from the burner 30 permit gases to flow around and between those spaced coils, as well as around the end of the helically coiled tube assembly 34. The hot gases then reverse direction, pass through the finned tube assembly 36 whereupon heat energy is convectionally transferred to fluid directed through the finned tubes 36,. The exhaust gases, after transferring the major portion of their heat energy, are then discharged from the exhaust stack 24.

Fluid exiting from the finned tube assembly 36 passes through the helically coiled tube 34, which as described above, is directly exposed to the radiant heat of hot gases. Heat is transferred by direct radiation to the radially inner surfaces of the heatedly coiled tubes 34. The radially outer surface of the coiled tube 34 is primarily heated by convection. At the end of the helically coiled tube 34 spaced from the burner 30, an inlet port 54 is provided for fluid connection between the helically coiled tube 34 and the finned tube assembly 36. The finned tube assembly 36 is concentrically disposed about, and contiguous with, the external surface of the helically coiled tube assembly 34. The resultant even distribution of heat results in an absence of "hot spots", less fluid degradation, longer tube life, and higher fluid operating temperature. This also contributes to a lower temperature differential and consequently less heat loss through the walls of the insulated firebox 12 and to low stack temperature, indicative of the highly efficient transfer of heat energy in the oil heater 10 embodying the present invention.

The finned tube assembly 36 comprises a plurality of finned tubes 38 arranged in parallel. As shown in FIG. 4, the finned tube assembly 36 almost completely circumscribes the heatedly coiled tube 34. Desirably, the finned tube assembly circumscribes at least about 90% of the external circumference of the heatedly coiled tube 34. The ends of each of the parallel disposed finned tubes are in communication with separate manifolds. An inlet end 40 and an outlet end 42 of all of the finned tubes 38 may be respectively connected to separate common manifolds whereby all of the inlet ends 40 are connected to an inlet manifold 44, and all of the outlet ends 42 of the finned tubes 38 are reconnected to a common outlet manifold 46, as illustrated in FIG. 6. The term "common manifold", as used herein and in the claims means a manifold that is mutually shared in common with the identified tube ends.

Alternatively, the finned tube assembly 36 may comprise a plurality of two or more separate sections of parallel finned tubes 38. For example, a two-section finned tube arrangement is illustrated in the schematic diagram illustrated in FIG. 5. In this arrangement, fluid to be heated is delivered from the pump 20 to the inlet manifold 44, then through a first section 48 of parallel finned tubes 38 whereat the fluid is initially heated. The initially heated fluid is then discharged through the outlet ends 42 to a manifold 50 providing common, or mutual, fluid communication between the outlet ends 42 of the first section 48 of finned tubes 38 and the inlet ends 40 of a second section 51 of finned tubes 38. Fluid passing through the second section 51 of finned tubes 38 is then additionally heated and discharged from the outlet ends 42 of the second section 51 into a common outlet manifold 46, whereupon the fluid is discharged from an outlet end 52 of the conventionally heated finned tube assembly 36 and into the inlet port 54 of the helically coiled tube 34.

In another arrangement, as illustrated in FIG. 7, the finned tube assembly 36 comprises three sections of finned tubes 38. The operation of the three-section finned tube assembly is similar in its initial fluid flow as that of the above-described two-section finned tube assembly 36. However, in the three-section arrangement, heated fluid discharged from the second section 51 of finned tubes 30 is directed into a common manifold 56 that provides fluid communication between the outlet ends 42 of the finned tubes 38 forming the second section 51 and the inlet ends 40 of a third section 58 of finned tubes 38. The previously heated fluid is then further heated in the third section 58 and then discharged from the outlet ends 42 of the finned tubes 38 forming the third section 58 into an outlet manifold 46, and thence from the outlet end 52 of the conventionally heated finned tube assembly 36 into the inlet end 54 of the radially heated helically coiled tube 34.

In practice, the internal diameter of the helically coiled tube 34 is desirably much greater than that of the individual finned tubes 38. Thus, a design consideration in determining the number of tubes 38 in each section of the finned tube assembly 36 is to provide a sufficient number of finned tubes 38 so that the collective cross-sectional areas of the finned tubes 38 in each section is desirably at least equal to, and preferably greater than, the cross-sectional area of the helically coiled tube 34. However, due to the much shorter length of the individual finned tubes 38 with respect to the helically coiled tube 34, the cross-section area of the helically coiled tube 34 could, in some applications, be greater than the collective cross-sectional area of the finned tubes 38.

The fluid heating sections, comprising the helically coiled tube 34 and the finned tube assembly 36 are advantageously mounted on a pair of rails, or channel irons, 64 disposed in a lower portion of the firebox 12. By this arrangement, the entire fluid heating assembly 34, 36 can be removed from the firebox 12 for service when needed.

With the specific reference to FIG. 5, the flame produced by burner 30 extends axially along the longitudinal axis 32 producing both radiant heat energy and hot gases. As described above, radiant heat energy from the flame is directed onto the concentrically disposed surfaces of the helically coiled tube, with the addition of hot gases passing along the inner surfaces of the helically coiled tube 30, and thence through the spaced-apart end coils of the helically coiled tube 30 and around the end of the helically coiled tube assembly 34, then reversing direction and imparting heat energy to the fluid circulating through the finned tube assembly 36. After passing through the finned tube assembly 36, the gases are exhausted through the stack 24 into the atmosphere.

Heretofore, the temperature of gases discharged from the exhaust stack have generally been on the order of at least 500° F., and more typically on the order of 800° F. This represents a significant loss of heat energy. In the oil heater 10 embodying the present invention, the temperature of gases discharged from the exhaust stack have been measured at about 300° F., at 5,000 ft. altitude.

Also, a general rule of thumb is that the stack temperature should be within 100° F. of the recirculating heat transfer fluid at the point of supply, i.e., the inlet port 16. In one test of the oil heater 10 embodying the present invention, the exhaust stack temperature was within 30° F. of the temperature of the inlet fluid temperature, further indicating highly advantageous thermal efficiency. Thermal efficiencies in excess of 90% are routinely anticipated by use of the oil heater 10 embodying the present invention. A major contributor to the high thermal efficiency of the oil heater 10 embodying the present invention, is attributable to the concentrically disposed convectionally heated finned tube assembly 36. Incoming fluid to be heated is discharged from the circulating pump 20 through the finned tube assembly 30, in a counterflow direction to the direction of flow of the heated gases. Thus, the hottest gases are at the discharge end 52 of the finned tube assembly. After transferring thermal energy to the finned tube assembly 36, the coolest gases are discharged through the exhaust stack 24 at the inlet end of the finned tube assembly 36.

If multiple sections of parallel finned tubes are used, it can readily be seen that the temperature of fluid flowing through the finned tube assembly 36 will progressively increase from the inlet end to the outlet end 52. For example, with reference to FIG. 7 in which a three-section assembly is schematically illustrated, as fluid passes from the first section 48 through the second section 52, and thence through the third section 58, fluid temperature progressively increases. The heating effect is enhanced by the counterflow of hot gases passing over the finned tubes 38. The entire heat transfer process takes place within the insulated firebox 12 which is lined with a ceramic fiber blanket, as shown in FIG. 4. In addition, as discussed above, the concentric arrangement of the radiantly and convectively heated fluid heating sections, with the convective heat exchanger section being disposed around the radiant section, lowers the temperature differential across the insulated outer shell of the firebox 12, thereby lowering the heat loss and enhancing the overall efficiency of the oil heater 10.

As illustrated in FIG. 5, a pressure differential switch 60 senses the pressure drop between the flow into the finned tube section 36 and the discharge flow from the helically coiled tube 34. If there is a blockage or other unscheduled shut down in the process loop, the differential pressure switch 60 automatically shuts down the oil heater 10. Alternatively, a flow switch in the outlet flow line could be used in place of the pressure differential switch 60. This is an extremely important safety feature because blocked flow in the process loop could result in damage to the unit and a possible fire hazard if the unit continues to run without fluid flow.

INDUSTRIAL APPLICABILITY

The oil heater 10 embodying the present invention is particularly useful in processes which require fluid heating. Such processes include asphalt and petrochemical processes, chemical processing and treatment applications, and food processing applications. The coaxial, concentric arrangement and the resultant internal piping configuration eliminates the rumbling and vibration often associated with hot oil heaters. The concentric finned tube construction provides a very large surface area for convective heat transfer without increasing the overall length of the oil burner 10. By placing the convective heat exchanger 36 around the radiant section 34, the temperature differential across the outside shell is reduced. Also, as a result of the efficient concentrically disposed heating sections, disadvantageous NOx emissions are reduced. Internal vibrations in the unit can produce perturbations which interrupt the ignition and combustion efficiency of the flame produced by the burner 30. Thus, the concentric configuration of the radiant and convection heating assemblies 34, 36 allow for uniform thermal expansion of the unit as a whole, resulting in smooth operation, minimized shell stresses, and the elimination of differential internal displacement that can result in mechanical damage and fatigue failure.

Although the present invention is described in terms of a preferred exemplary embodiment, and is characterized throughout the description as an oil heater, those skilled in the art will recognize that oil heaters are equally adaptable to the heating of other fluids. Also, although the helical coil 34 and finned tube assembly 36 of the oil heater 10 described herein are shown disposed horizontally, they could also be coaxially disposed about a vertical axis, if so desired. Furthermore, those skilled in the art will recognize that the number of separate sections of parallel finned tubes 38 within the finned tube assembly 36 may be varied. Although arrangements of one, two, and three sections are described above, those skilled in the art will recognize that more than three, for example four or more sections, may be included without departing from the spirit of the invention. Such changes are intended to fall within the scope of the following claims. Other aspects, features, and advantages of the present invention may be obtained from a study of this disclosure and the drawings, along with the appended claims.

ELEMENT LIST 10 oil heater
12 firebox 14 expansion tank
16 inlet port
18 outlet port
20 circulation pump
22 motor
24 exhaust stack
26 control
28 vapor removal chamber
30 burner
32 longitudinal axis
34 helically coiled tube
35 outlet end (of 34)
36 finned tube assembly
38 finned tubes
40 inlet end
42 outlet end
44 inlet manifold
46 outlet manifold
48 first section of finned tubes
50 manifold
51 second section of finned tubes
52 outlet end of 36
54 inlet end of 34
56 common manifold
58 third section of finned tubes
60 pressure differential switch
64 rails

What is claimed is:

1. An oil heater, comprising:
a helically coiled tube coaxially disposed about a central axis and having an inlet end and outlet end, said outlet end being in fluid communication with a conduit adapted to receive heated oil;
a plurality of finned tubes concentrically disposed about said helically coiled tube, each of said finned tubes having an inlet end and outlet end, the inlet end of at least one of said plurality of finned tubes being in fluid communication with a source of fluid to be heated, and the outlet end with at least another one of said plurality of finned tubed being in fluid communication with said inlet end of the helically coiled tube;
a burner aligned with said central axis of the helically coiled tube; and
a vapor removal chamber interposed between said source of oil to be heated and said inlet end of said at least one of said plurality of finned tubes.

2. The oil heater, as set forth in claim 1, wherein said oil heater comprises a pump interposed between said source of oil to be heated and the inlet end of said at least one of the plurality of finned tubes.

3. The oil heater, as set forth in claim 1, wherein said plurality of finned tubes includes a plurality of separate sections of finned tubes, the inlet ends of the finned tubes in each section being in fluid communication with a first common manifold, and the outlet ends of the finned tubes in each section being in fluid communication with a second common manifold.

4. The oil heater, as set forth in claim 3, wherein the inlet ends of a plurality of finned tubes comprising a first section of finned tubes are in fluid communication with a common manifold in fluid communication with said source of the oil to be heated, and the outlet ends of the plurality of finned tubes comprising the first section of finned tubes is in fluid communication with a common manifold in fluid communication with the inlet ends of a plurality of finned tubes comprising a second section of finned tubes.

5. The oil heater, as set forth in claim 4, wherein the outlet ends of the finned tubes comprising said second section of finned tubes are in fluid communication with a common manifold that is also in fluid communication with the inlet ends of a plurality of finned tubes forming a third section of finned tubes.

6. The oil heater, as set forth in claim 1, wherein said oil heater includes a differential pressure switch adapted to sense the pressure differential between said source of oil to be heated and heated oil discharged from said outlet port of the helically coiled tube.

7. The oil heater, as set forth in claim 1, wherein said oil heater includes an expansion tank having a curved bottom surface that at least partially conforms with a curved outer surface of a firebox in which said helically coiled tube and said finned tube assembly are disposed.

8. The oil heater, as set forth in claim 1, wherein said plurality of finned tubes concentrically disposed about said helically coiled tubes surround at least about 90% of the perimeter of said helically coiled tube.

9. An oil heater, comprising:
an insulated firebox having a longitudinal axis;
a burner disposed at an end of said firebox and adapted to direct a flame into said firebox in a direction coaxially aligned with said longitudinal axis of the firebox;
a helically coiled tube coaxially aligned with said longitudinal axis and positioned to be primarily radiantly heated by the flame directed by said burner, said helically coiled tube having an inlet end and outlet end;
a plurality of finned tubes coaxially disposed about an outer perimeter of said heatedly coiled tube and arranged to be primarily heated by convection heat transfer provided by hot gases produced by the flame directed by said burner, each of said finned tubes having an inlet end and an outlet end;
a pump in fluid communication with a source of fluid to be heated and the inlet end of at least one of said finned tubes;
a vapor removal chamber interposed between said source of oil to be heated and the inlet end of said at least one of said finned tubes;
an expansion tank in fluid communication with said vapor removal chamber; and
a differential pressure switch adapted to sense the pressure differential between said source of oil to be heated and heated oil discharged from said outlet end of the helically coiled tube.

10. The oil heater, as set forth in claim 9, wherein said plurality of finned tubes coaxially disposed about said helical coil surround at least about 90% of the perimeter of said helical coil.

* * * * *